Feb. 2, 1932.   H. E. FULLER   1,843,714
FISHING ROD
Filed May 16, 1930
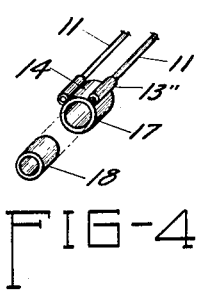
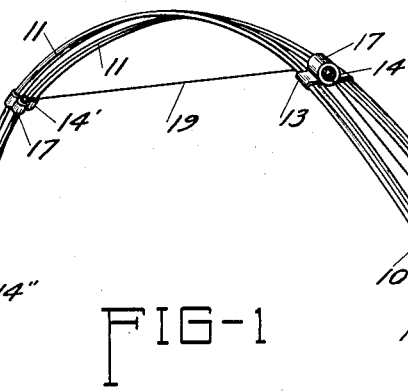
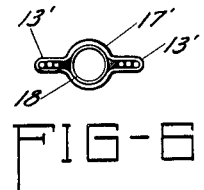
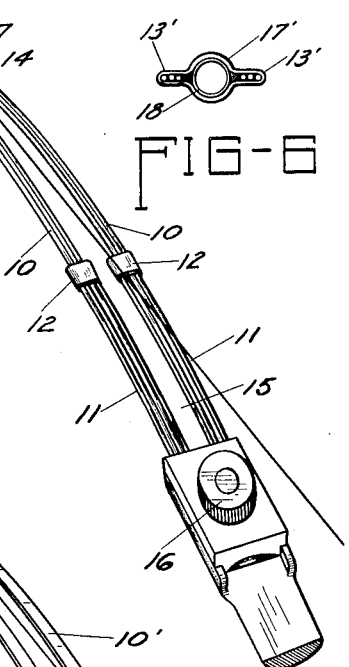
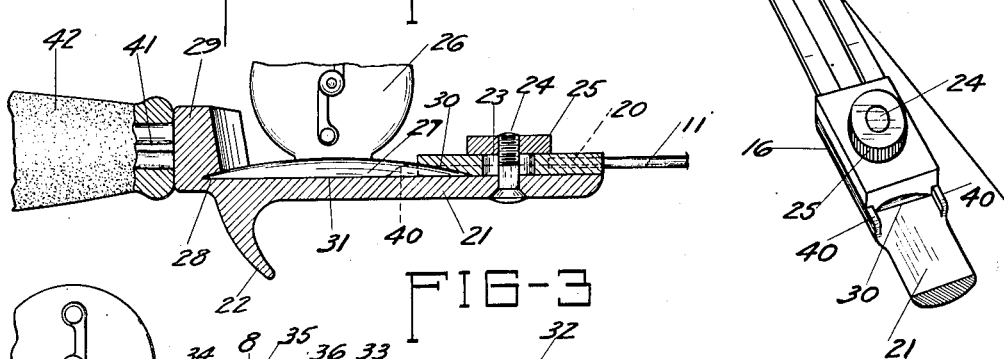
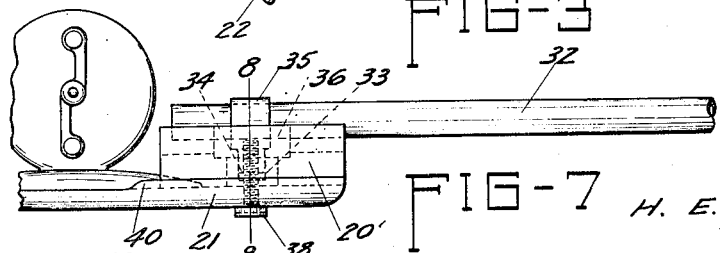
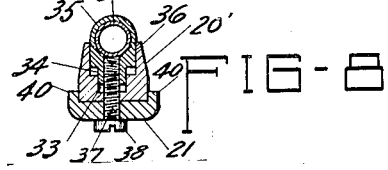
H. E. FULLER Inventor
By Merrill M. Blackburn,
Attorney Patented Feb. 2, 1932

1,843,714

UNITED STATES PATENT OFFICE

HARRY E. FULLER, OF NEWHALL, IOWA

FISHING ROD

Application filed May 16, 1930. Serial No. 452,944.

My invention relates to fishing rods, and more particularly to casting rods such as used by fishermen in fly casting for fish such as trout or other fish of a character that take the hook when thrown from a boat or the shore, this being a continuation in part of my application Serial No. 380,232, filed July 22, 1929.

It is the principal purpose of my invention to provide a rod which will allow the line to be run out freely without possibility of entangling the same on the rod, either in casting or in playing the fish after the same has been caught on the hook. To accomplish this purpose the rod preferably comprises a shaft made up of separate rod-like members arranged in substantial parallelism to provide a space between the same.

It is another purpose of my invention to provide means for mounting a reel detachably on a reel seat member by providing a slidable member for clamping the base of said reel on its seat, preferably by a wedging action.

It is another object of my invention to provide a rod that is light and strong and of graduated flexibility from the butt or handle end thereof to the tip end thereof, so that the same will respond with a constant tension on the line to all the movements of the fish while struggling to escape.

It is another object of my invention to provide guide members that are detachably mounted in suitable holding means provided on members that connect the spaced rod-like members constituting the shaft portions of the fishing rod, said guide members lying in alignment with the space between the said rod-like members.

Other objects and advantages of my invention will appear as the description of the drawings proceeds. It is to be understood, however, that I do not intend to limit myself to the details shown or described except as defined in the claims.

In the drawings:

Fig. 1 is a perspective view of my improved rod, a portion of the handle being broken away.

Fig. 2 is a view similar to Fig. 1 of a modified form of rod.

Fig. 3 is an enlarged fragmentary longitudinal sectional view through the handle portion of the device, a portion of a reel being shown in elevation in relation thereto.

Fig. 4 is a detail perspective view of the tip end bridging member showing the line guide detached therefrom.

Fig. 5 is a detail view in elevation of one of the bridging members.

Fig. 6 is a similar view of a modified form of bridging member.

Fig. 7 is a fragmentary elevational view of the forward end of the handle portion of a fishing rod made in accordance with my invention showing a tubular or round rod associated therewith, and Fig. 8 is a section taken on the line 8—8 of Fig. 7.

Referring in detail to the drawings, my improved fishing rod is shown in Fig. 1 as comprising a pair of elongated flexible members 10, which are each made up of a plurality of wires 11 arranged to lie side by side and are held in such position by suitable clip members 12 and the wire receiving portions 13 of bridge members 14, 14' and 14'' so that said members 10 are, in effect, a pair of elongated rod-like members each made up of a plurality of wires with a space 15 between the two members 10, the bridge members 14, 14' and 14'' holding the members 10 in parallel spaced relationship so that the space 15 is substantially uniform from end to end of the shaft portion of said rod.

The members 10 are made in such a manner that the same become more flexible in a direction away from the handle portion of the fishing rod, and in order to obtain such gradually increasing flexibility of the members 10 the number of wires comprising each of said members 10 is reduced toward the tip end of the rod. In the form shown in Fig. 1 four wires 11 are provided between the butt or shank 16 of the rod and each clip 12, three wires 11 between each clip 12 and the bridge member 14, each member 10 comprises two wires 11 between the bridge member 14 and the bridge member 14', and each member 10 comprises one wire between the bridge member 14' and the tip end bridge member 14". The number of wires used and the decrease in number thereof toward said tip end is dependent upon the length of the shaft of the rod and the flexibility of said shaft desired.

Each of the bridge members 14, 14' and 14" is made substantially in the same general manner except for the provision of the number of wire receiving openings in the wire receiving portions 13 thereof, said wires extending through and being fixed in the openings in the wire receiving portions 13 of the bridge members, which openings are arranged in a row so that the wires 11 are arranged in parallelism to provide a rod-like member that will be of flattened form with its greatest dimension crosswise thereof. Each of the bridge members comprises a central tubular guide receiving portion 17, which, in the form shown in Figs. 1, 4 and 5 is mounted eccentrically of the central transverse plane of the wire receiving portions 13 thereof, to thus locate the guide receiving members 17 out of transverse alignment with the rod-like members 10. The members 17 receive the tubular guide members 18 made of any suitable material for reducing the friction between the line 19 and said members 18.

The members 18 are made to fit snugly within the cylindrical openings in the members 17 and may be removed therefrom by pushing on the same with a pointed member, such as a pencil or similar member of small cross-section. If the guide members 18 due to wear, or for any other reason, should fit too loosely within the guide receiving members 17 to assure their remaining in place by frictional engagement between the outer surface of the members 18 and the inner surface of the members 17, a thin piece of material such as a piece of paper or cloth may be placed between said members 17 and 18 during assembly thereof to make the members 18 fit tightly within the members 17. The members 14 and 14' have the wire receiving portions 13 thereof extending laterally therefrom in the form of flanges or wings thereon, while the members 14", due to the fact that the members 13 thereon receive only a single wire 11, are merely tubular projections on the guide receiving portion 17 of said member 14".

The bridge members may be arranged in any desired manner on the shaft forming members 10, the guide receiving portions 17 thereof being shown as extending upwardly above the rod on the member 14 in Fig. 1, but depending therefrom at the members 14' and 14" in said figure, this arrangement providing the least opportunity for the line 19 to come in contact with the rod, when in use.

Instead of offsetting the line guide 18 from the central transverse plane of the wire receiving portion of the bridge member, the same may be so arranged as to have the center thereof lying in said plane, as shown in Fig. 6, in which the wire receiving portions 13' have the center line thereof extending substantially through the center of the guide receiving portion 17' to dispose the guide between the spaced pair of members comprising the shaft.

In Fig. 2 the shaft portion of the rod is shown as being made up of a pair of tapering flat metal strips 10', which decrease in width from the butt or shank 16 toward the tip end of the rod, the bridge members 14, 14' and 14" being made in substantially the same manner as previously described except that the openings therein are formed to receive the rod-like members 10' instead of the wires forming the rod-like members 10.

The bridge members are provided with line guide receiving members and guides for the line in the same manner, as described above, and space the members 10' from each other to provide the space 15 between the same, which is in alignment with the line guides 18 in both the forms shown in Figs. 1 and 2. The space 15 is relatively wide preferably being somewhat wider than the diameter of the opening in the guide 18 to thus permit such freedom of movement of the line that there is little or no opportunity of contact of the line with any part of the rod except the guides 18. The bridge members 14, 14' and 14" are formed so that the same will not have any sharp corners or angles therein on which the line might tend to catch. The pair of rod-like members forming the shaft portion of the fishing rod may be made of any suitable material, but are preferably made of spring steel or of spring wire, and when so made the rod will take an increasing curvature from the shank end to the tip end thereof bending like a whip at each tug of the fish, and springing back quickly and sharply enough to prevent the fish from shaking off the hook upon relaxation of the struggle by the fish.

The butt or shank 16 of the rod preferably comprises a slidable base block 20 and a reel seat member 21, having a finger piece 22 thereon and having side flanges 40 between which the reduced lower portion of the block 20 slides. The slidable base block 20 rigidly carries the wires 11 forming the members 10 or the strips forming the members 10', and is provided with a slot 23 running lengthwise thereof, through which the bolt 24 passes. The bolt 24 is provided with a knurled nut 25 for clamping the slidable block 20 in adjusted position upon the member 21. A reel 26 having a base 27 is mounted on the reel seat member 21, said member 21 being provided with a tapering partly circular groove 28 between the upstanding rear end portion 29 thereof and the bottom portion thereof, and the elongated base 27 of the reel 26 is made with a convex upper surface terminating in a thinned edge received in said groove 28, and fitting in the concave recess 30 provided in the under side of the block 20 at the rear end portion thereof. The member 21 is provided with a rearwardly extending shank portion 41 upon which the handle 42 is mounted.

It will be seen that by sliding the block 20 toward the rear end of the member 21, the base portion 27 of the reel 26 will be clamped between the portion 29 of said member 21 and the slidable block 20 and will be forced down against the flat upper face 31 of the member 21 due to the wedging engagement between the block 20 and the base 27 of the reel.

While the block 20 is shown in Fig. 3 as being of a suitable type for use in conjunction with my improved form of shaft for a fishing rod the same may be used in conjunction with a tubular or round rod tapering toward the top end thereof, such as the rod 32 in Fig. 7, and while the general principle of the reel holding means is the same as in the form shown in Fig. 3, the same is slightly modified. As will be evident from Figs. 7 and 8, the reel seat member 21 has the side flanges 40 thereon between which the lower portion of the block 20' is slidably mounted. The block 20' is grooved; the groove therein having a lower relatively short and narrow portion 33 receiving the reduced lower end 34 of the rod receiving clamp 35, the main body portion of which fits slidably within the upper wider and longer portion 36 of said groove. The bolt-like member 37, having a slotted and knurled head 38, serves to engage the clamp 35 to clamp the block 20' in adjusted position on the reel seat member 21, said member 21 cooperating with the base 27 of the reel 26 in the manner described with reference to Fig. 3. Since the rod 32 passes through the eye of clamp 35 and is drawn down against V-shaped seats in block 20' it will be rigidly held in place.

It will be noted that there are no angles or projections along the shaft portion of the rod such as would tend to catch or loop the line, and that the line will be in engagement only with the smooth guides thus reducing the friction to a minimum. This makes it possible to make long casts with very little bodily motion and will thus cause little or no disturbance to the fish when a cast is made. The reduction of the friction to a minimum will also increase the life of the line. The means for detachably clamping the reel in position makes it possible to change reels for use with different lengths and weights of lines, as may be desired.

While I have referred above to wire receiving openings in the wire receiving portions, I wish to state that I consider it preferable to slide the clips 12 and bridges 14, etc. upon the rod members until they are in place and then fill the space around and between the wires with solder. In other words, the clips and bridges are soldered to the rod members.

It is of course understood that the specific description of structure set forth above may be departed from without departing from the spirit of my invention as set forth in this specification and the appended claims.

Having thus described my invention, I claim:

1. In a casting rod an elongated flexible shaft comprising separate rod-like members providing a space therebetween and cross members provided with line guides connecting said rod-like members, said cross members being located at intervals along said shaft.

2. A casting rod comprising a handle, a pair of separated members extending from adjacent said handle to the tip end of said rod and cross bridges connecting said members at intervals.

3. A casting rod comprising a handle, a pair of separated members extending from adjacent said handle to the tip end of said rod, cross bridges connecting said members at intervals and line guides carried by said cross bridges.

4. In a fishing rod, a handle, and a shaft extending from said handle, said shaft comprising spaced elongated flexible members extending from end to end of said shaft and means connecting said members to maintain the same in substantial parallelism.

5. In a fishing rod, a handle, and a shaft extending from said handle, said shaft comprising spaced elongated flexible members extending from end to end of said shaft and cross bridges connecting the same at intervals.

6. In a fishing rod, a handle, and a shaft extending from said handle, said shaft comprising spaced elongated flexible members extending from end to end of said shaft and cross bridges connecting the same at intervals, said cross bridges being provided with line guides.

7. In a fishing rod, a handle and a shaft extending from said handle, said shaft comprising spaced elongated rod-like members, cross members connecting the same at intervals, and line guides detachably mounted in said cross members.

8. An angler's casting-rod whose shaft is composed of a pair of separated, elastic members, tapering from butt to tip, and provided with line-guiding cross-bridges.

9. An angler's casting-rod whose shaft is composed of a pair of elastic metal members of gradually increasing flexibility from butt to tip, and provided with line-guiding cross-bridges at intervals.

10. An angler's casting-rod whose shaft is composed of a pair of elastic members spaced apart for the free movement of the line between them, and provided with connecting cross-bridges with line-guides disposed in a plane substantially midway of the space and perpendicular to the side members transversely.

In witness whereof, I hereunto subscribe my name to this specification.

HARRY E. FULLER.